Jan. 16, 1945.　　　J. A. TAYLOR　　　2,367,475
AUTOMOBILE LAMP REFLECTOR
Filed Aug. 13, 1941
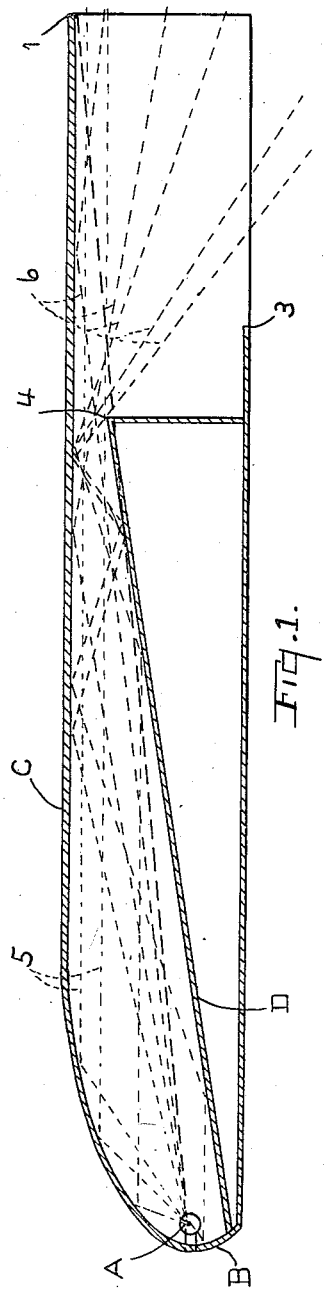
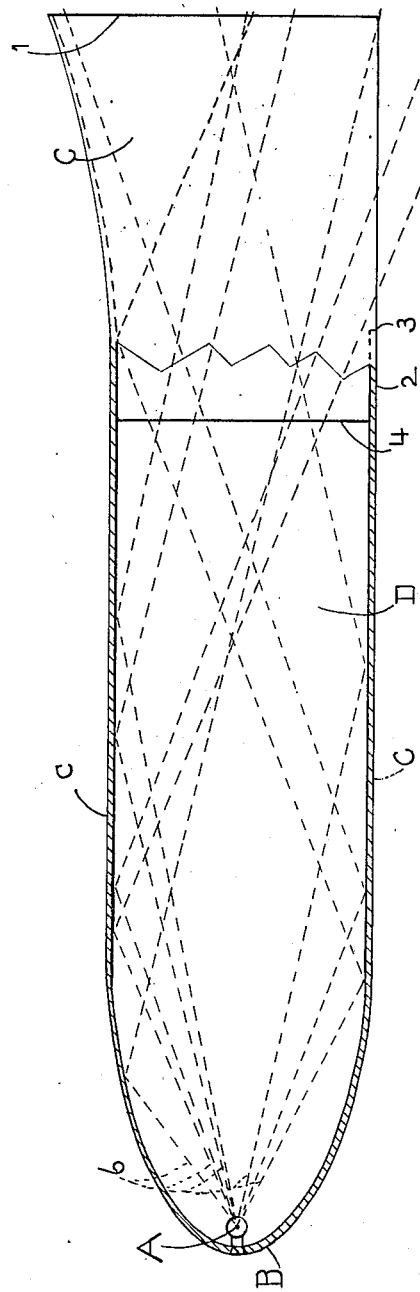
INVENTOR
James A. Taylor Patented Jan. 16, 1945

2,367,475

UNITED STATES PATENT OFFICE 2,367,475

AUTOMOBILE LAMP REFLECTOR

James A. Taylor, Glen Ridge, N. J.

Application August 13, 1941, Serial No. 406,579

5 Claims. (Cl. 240—41.35)

The main object of an automobile lamp is to provide adequate illumination of the road and at the same time to prevent stray beams of light from rising above the level of the lamp to dazzle the oncoming motorist particularly as he draws nearer. Many types of lenses have been used to accomplish this purpose. It is considered a distinct advantage to provide a lamp composed entirely of reflectors without any lenses both on the ground of expense in original equipment and of breakage and the inconvenience of having broken or imperfect lenses.

The object of my invention is to provide a reflector which prevents the escape of any light beams except parallel to the ground or directed downward and which on the approach of an oncoming car becomes less and less visible. This is accomplished by providing an intercepting reflector for all of those beams which are directed upward and turning them downward, by concealing the light itself behind the reflecting parts so that no direct beams emerge without being reflected as desired and by having the top area of light projected in a straight horizontal line and by shielding the lateral beams so as to prevent shining in the oncoming driver's eyes.

To such ends my said invention in its preferred form consists of a light, a reflector comprising a parabolic mirror back of the light, a flat top having its forward end a straight, horizontal line, side reflectors and a bottom reflector slanting upward and forward from below the light to a point higher than the same and higher than a line drawn from the light to the front end of the top of the reflector. So constructed the parallel beams from the parabolic back which rise above the bottom part will issue from the reflector parallel to the earth. All other light beams including those which strike the bottom part or those direct from the light striking the sides or top will be reflected down. Since it is desirable to see more of the right hand side of the road than the left, the right side reflector is shorter than the left so that the left hand side may reflect to the right without interference by the right side wall. For turning left hand curves, in practice the left hand wall may be slightly curved to the left thus reflecting some of the beams to the left but in no case upward. If it is preferred to have the light concentrated ahead and to the right this may be done by having the left hand wall in a straight line. Since the light itself is invisible from in front and no light beams emerge so as to be visible above the top of the reflector, the oncoming driver does not see the light and there is no glare at all. The only things visible are the lighted road and the dust in the air and even these become less and less visible as the car approaches instead of the present dangerously increasing glare from glass reflectors. The economy of light and safety factors are obvious. The previously wasted glare beams are now on the road.

In practice the end of the reflector is enclosed in glass to prevent the accumulation of dust and water in the reflector.

While I have shown the preferred form of my invention as adapted to an automobile lamp, it is of course adaptable to any form of reflector for any light.

My said invention is fully shown, described and claimed in the following specification, of which the accompanying drawing forms a part; wherein letters or numerals of reference designate like or equivalent parts wherever found throughout the several views and in which:

Figure 1 is a side view of the entire device in section through the middle.

Figure 2 is a top view of the same with the rear portion of the top of the reflector removed and the parabolic mirror and side walls in section.

Referring to the drawing:

My new and improved automobile lamp reflector comprises the light source A, the parabolic reflector part B, the forward extending hood C and upwardly extending bottom reflector part D. The reference numeral 1 represents the forward, straight edge of the top of the reflector hood C. The right hand side wall 2 (Fig. 2) of the hood C extends only to the point 3 while the left hand wall extends the full length of the hood and is at the forward end slightly curved to the left to provide for a portion of the light illuminating the oncoming vehicle and the curves in the road. The dotted line A . . . 1 (Fig. 1) indicates the imaginary line from the lamp to the forward edge of the top reflector showing the top 4 of the bottom reflector D rising above such line A . . . 1. The bottom reflector has been found in practice to work most effectively if extended approximately to two thirds of the hood.

It will be seen by the dotted lines 5 (Fig. 1) that certain of the rays from the parabolic mirror B are reflected but once, parallel to the top of the reflector while all other rays shown by dotted lines 6 are reflected two or more times but emerge always in a downward direction from the reflector and that no rays can emerge above the level of the top of the reflector. It will be seen that since the right wall of the reflector is shorter than the left wall, more light rays will be reflected to the right to light up the right edge of the road, pedestrians etc., while a smaller portion will illuminate oncoming cars and left hand curves.

I claim:

1. In a device of the class described, a lamp, a reflector for the same whose walls reflect all light rays out of the reflector below the level of the top of the reflector comprising a forward reflecting part behind such lamp, a reflector hood continuous with such rear reflector having the forward portion of its top flat and horizontal and a flat bottom part slanting upward toward the top and front of such reflector from below the level of such lamp and rising to a point where it intercepts and reflects all direct and reflected rays of light from the lamp directed below the front end of the top of the reflector.

2. In a device of the class described, a lamp, a reflector for the same comprising a flat bottom part slanting upward and forward from below the level of the lamp and a flat, top part extending forward beyond the point to which light rays are reflected by the bottom part upwards against the top.

3. In a device of the class described, a lamp, a reflector for the same comprising a bottom part slanting upward and forward from below the level of the lamp to a point at which all direct rays from such lamp which are directed below the front end of the top part are reflected upward and a flat, top part extending to such distance that it will reflect downward all upwardly directed rays.

4. In a device of the class described, a lamp, a continuous reflector for such lamp having a flat horizontal top part and a flat upwardly inclined bottom part relatively positioned so as to conceal such lamp from view from in front of the same and to cause all upwardly directed rays of light to be reflected downward.

5. In a device of the class described, a lamp, a reflector for such lamp for projecting parallel and horizontal light rays the upper portion only of which emerge directly from such reflector and all of the remainder of the same are reflected upward and then downward, comprising a parabolic rear part of such reflector, a flat top of the same and upwardly inclined flat bottom part of the same, such top and bottom parts being so positioned as to conceal the lamp from view and to cause all upwardly directed rays to be reflected downward.

JAMES A. TAYLOR.